(12) United States Patent
Fahland et al.

(10) Patent No.: US 9,738,328 B2
(45) Date of Patent: Aug. 22, 2017

(54) ACTIVE SPLITTER FOR A MOTOR VEHICLE

(71) Applicant: GM GLOBAL TECHNOLOGY OPERATIONS LLC, Detroit, MI (US)

(72) Inventors: Jason D. Fahland, Fenton, MI (US); Joshua R. Auden, Brighton, MI (US); David Dominguez, Tucson, AZ (US)

(73) Assignee: GM Global Technology Operations LLC, Detroit, MI (US)

( * ) Notice: Subject to any disclaimer, the term of this patent is extended or adjusted under 35 U.S.C. 154(b) by 33 days.

(21) Appl. No.: 14/959,905

(22) Filed: Dec. 4, 2015

(65) Prior Publication Data

US 2017/0158258 A1 Jun. 8, 2017

(51) Int. Cl.
*B62D 35/00* (2006.01)
*B62D 37/02* (2006.01)

(52) U.S. Cl.
CPC ........... *B62D 35/005* (2013.01); *B62D 37/02* (2013.01)

(58) Field of Classification Search
CPC .............................. B62D 35/005; B62D 37/02
USPC ................................. 296/180.1, 180.5, 181.5
See application file for complete search history.

(56) References Cited

U.S. PATENT DOCUMENTS

| | | | | |
|---|---|---|---|---|
| 4,778,212 A | * | 10/1988 | Tomforde | B62D 35/005 180/903 |
| 6,286,893 B1 | * | 9/2001 | Presley | B62D 35/005 296/180.5 |
| 8,100,460 B2 | | 1/2012 | Butlin, Jr. et al. | |
| 9,102,366 B1 | | 8/2015 | Kim et al. | |
| 9,381,957 B1 | * | 7/2016 | Auden | B62D 35/007 |
| 2007/0257512 A1 | * | 11/2007 | Anderson | B62D 35/00 296/180.1 |
| 2009/0115221 A1 | | 5/2009 | Shinedling et al. | |
| 2010/0140976 A1 | * | 6/2010 | Browne | B62D 35/005 296/180.1 |
| 2015/0054302 A1 | * | 2/2015 | Yamaguchi | B62D 37/02 296/180.1 |
| 2015/0149046 A1 | * | 5/2015 | Jeong | G01G 19/12 701/49 |

(Continued)

FOREIGN PATENT DOCUMENTS

DE 10245463 A * 12/2005

OTHER PUBLICATIONS

Machine Translation of DE10245463A1, printed from the EPO website, Mar. 2, 2017.*

*Primary Examiner* — Jason S Morrow
(74) *Attorney, Agent, or Firm* — Quinn IP Law

(57) ABSTRACT

A splitter system for a vehicle includes a splitter body having a first splitter body side-section and a second splitter body side-section. The vehicle includes a vehicle body arranged along a longitudinal body axis and having a first vehicle body end configured to face incident ambient airflow. The splitter body is mounted at the first vehicle body end to generate an aerodynamic downforce thereon when the vehicle is in motion. A mechanism is configured to selectively and individually shift each of the first splitter body side-section and the second splitter body side-section relative to the first vehicle body end. The shifting of the splitter body side-sections by the mechanism in turn adjusts the aerodynamic downforce generated by the splitter body side-sections on the first vehicle body end.

20 Claims, 2 Drawing Sheets

(56) References Cited

U.S. PATENT DOCUMENTS

| | | | |
|---|---|---|---|
| 2015/0210325 A1* | 7/2015 | DeAngelis | B62D 35/02 296/180.1 |
| 2016/0229467 A1* | 8/2016 | Miller | B62D 35/005 |
| 2017/0057566 A1* | 3/2017 | Hommes | B62D 37/02 |

* cited by examiner

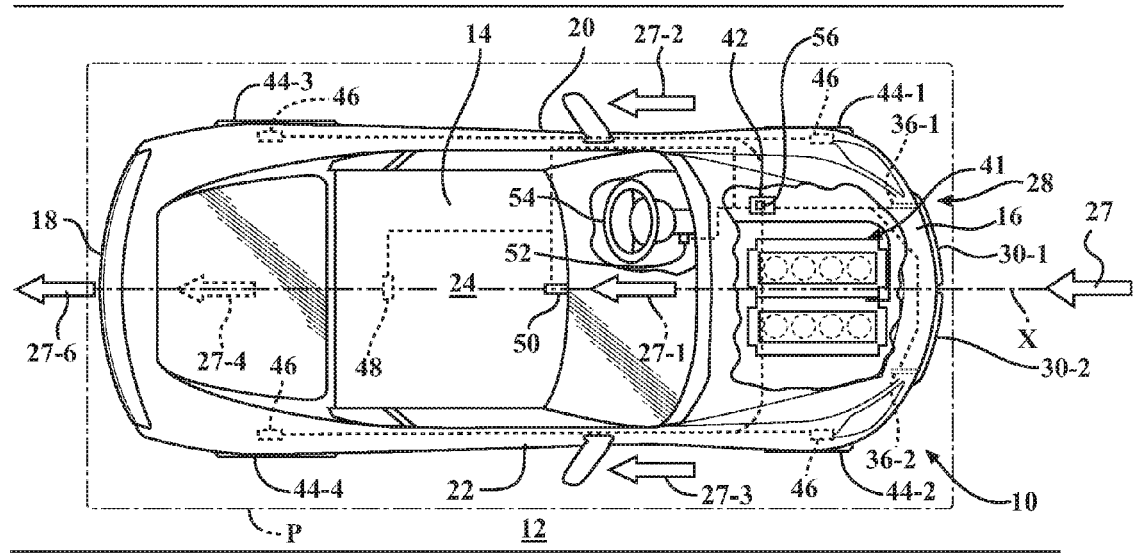
FIG. 1
FIG. 2
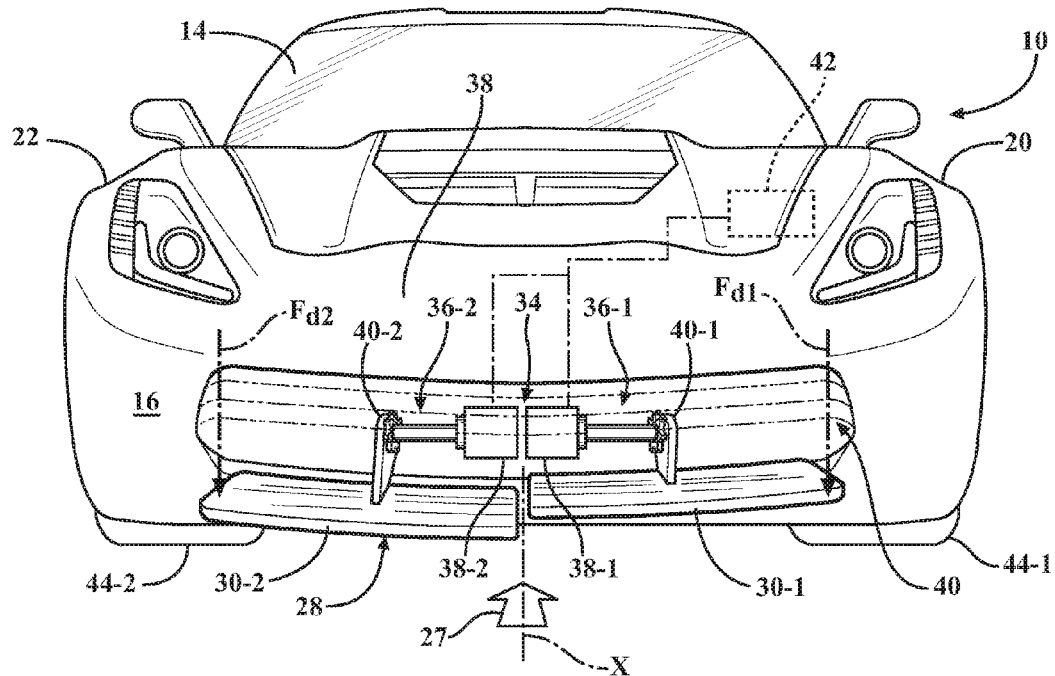

ACTIVE SPLITTER FOR A MOTOR VEHICLE

TECHNICAL FIELD

The disclosure relates to an active splitter for enhancement of aerodynamics of a motor vehicle.

BACKGROUND

Aerodynamics is a significant factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds. Additionally, the study of aerodynamics may also be used to achieve downforce in high-performance vehicles in order to improve vehicle traction and cornering abilities. The study is typically used to shape vehicle bodywork for achieving a desired compromise among the above characteristics for specific vehicle use.

A splitter is an aerodynamic device sometimes used to increase the amount of downforce at the front of the automobile. Typically, an incident airstream is brought to stagnation at the front of the vehicle above the splitter by an air dam, causing an area of high pressure. Below the splitter, the airstream is redirected away from the stagnation zone and is accelerated, causing the pressure to drop. Thus reduced, the pressure below the splitter combined with the high pressure above the splitter, creates downforce at the front end of the vehicle body. However, to the extent a splitter is effective in increasing downforce on the vehicle body, the splitter will generally also increase the vehicle's aerodynamic drag.

SUMMARY

A splitter system for a vehicle includes a splitter body having a first splitter body side and a second splitter body side. The vehicle includes a vehicle body arranged along a longitudinal body axis and having a first body end configured to face oncoming, i.e., incident, ambient airflow. The splitter body is configured for mounting at the vehicle's first body end to generate an aerodynamic downforce thereon when the vehicle is in motion. The splitter body includes a first splitter body side-section and a second splitter body side-section. The splitter system also includes a mechanism configured to selectively and individually shift each of the first splitter body side-section and the second splitter body side-section relative to the first vehicle body end. Such shifting of the first splitter body side-section and the second splitter body side-section via the mechanism is intended to adjust the aerodynamic downforce generated by the splitter body side-sections on the first vehicle body end. The actual articulation during shifting of the first splitter body side-section and the second splitter body side-section can take the form of rotation or tilting, lowering, or translation relative to the first vehicle body end into and out of the oncoming airflow.

The splitter system may also include an electronic controller configured to regulate the mechanism.

The vehicle may also include a road wheel and the splitter system may further include a first sensor configured to detect a rotating speed of the road wheel and communicate the detected rotating speed of the road wheel to the controller.

The splitter system may also include a second sensor configured to detect a yaw rate of the vehicle body and communicate the detected yaw rate to the controller.

The splitter system may also include a third sensor configured to detect a velocity of ambient airflow relative to the vehicle and communicate the detected velocity of the ambient airflow to the controller.

The vehicle may additionally include a steering wheel and the splitter system may further include a fourth sensor configured to detect an angle of the steering wheel.

The controller may be configured to selectively shift, via the mechanism, at least one of the first splitter body side-section and the second splitter body side-section relative to the first vehicle body end during vehicle cornering in response to the detected yaw rate, the detected angle of the steering wheel, and at least one of the detected rotating speed of the road wheel and velocity of the ambient airflow, to thereby vary the aerodynamic downforce on the vehicle's first body end and control the detected yaw rate.

The controller may be additionally programmed to selectively shift, via the mechanism, at least one of the first splitter body side-section and the second splitter body side-section relative to the first vehicle body end according to a lookup table establishing a correspondence of magnitude of shift of each of the first splitter body side-section and the second splitter body side-section and a magnitude of the aerodynamic downforce generated by each of the first splitter body side-section and the second splitter body side-section on the vehicle's first body end.

The mechanism may include at least one of a linear actuator, a rotary actuator, and an electric motor.

A vehicle employing such a splitter system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 1 is a schematic top view of a vehicle having a vehicle body arranged in a body plane along a longitudinal axis, and having a splitter system with individually controlled first splitter body side-section and a second splitter body side-section according to the disclosure.

FIG. 2 is a schematic front view of the vehicle shown in FIG. 1, depicting the first splitter body side-section positioned differently as compared with the second splitter body side-section, according to an embodiment the disclosure.

DETAILED DESCRIPTION

Figure 3:
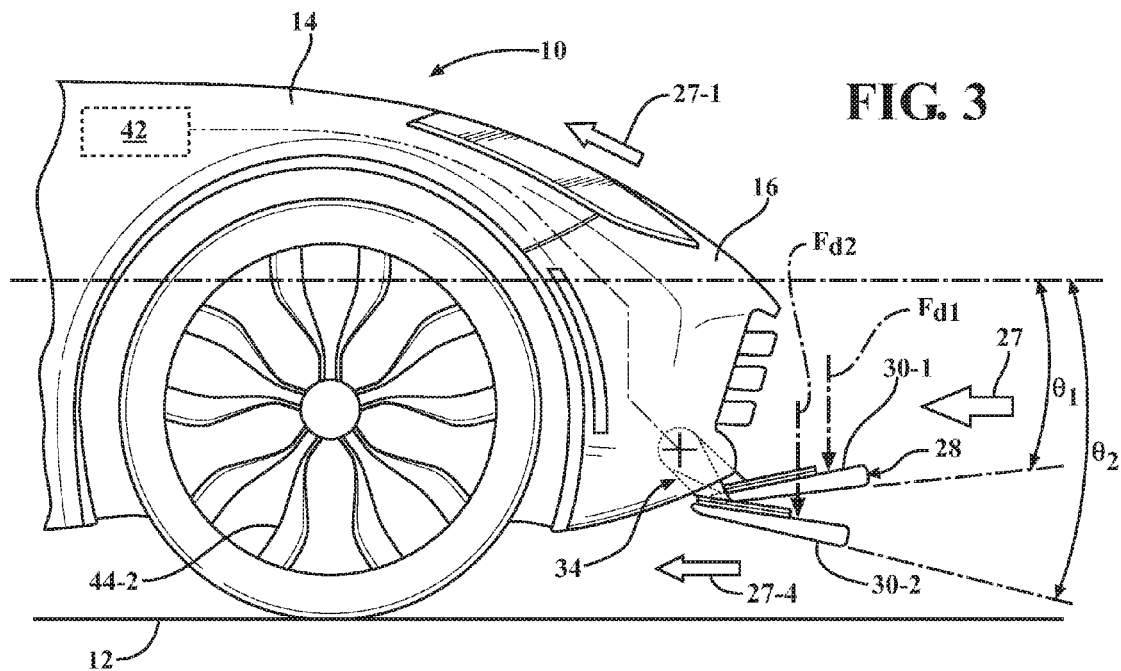
FIG. 3 is a schematic side view of the vehicle shown in FIG. 2, depicting the first splitter body side-section positioned differently as compared with the second splitter body side-section.
Figure 4:
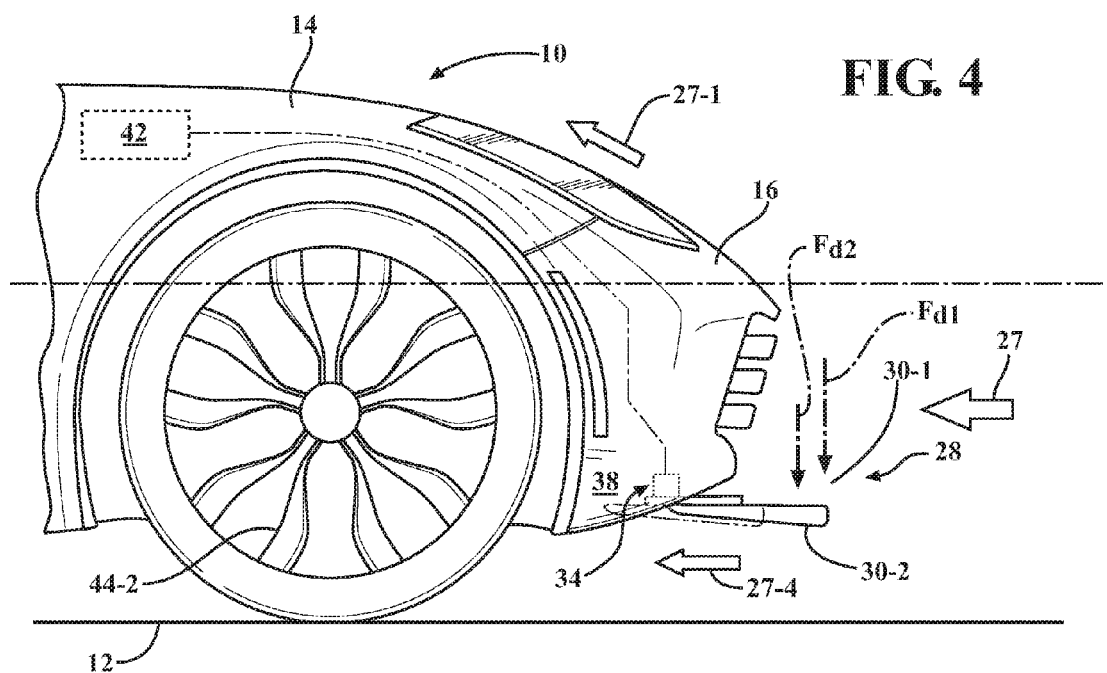
FIG. 4 is a schematic side view of the vehicle shown in FIG. 1, depicting the first splitter body side-section positioned differently as compared with the second splitter body side-section, according to another embodiment the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged in a body plane P that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion (not shown).

The left side 20 and right side 22 are disposed generally parallel to each other and with respect to a virtual longitudinal axis X of the vehicle 10, and span the distance between the front end 16 and the rear end 18. The body plane P is defined to include the longitudinal axis X. A passenger compartment (not shown) of the vehicle 10 is generally bounded by the front and rear ends 16, 18 and the left and right sides of the body 14. As understood by those skilled in the art, the front end 16 is configured to face an oncoming, i.e., incident, ambient airflow 27 when the vehicle 10 is in motion relative to the road surface 12. When the vehicle 10 is in motion, the oncoming ambient airflow 27 moves substantially parallel to the body plane P and along the longitudinal axis X.

As the vehicle 10 moves relative to the road surface 12, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and the fourth airflow portion that passes under the vehicle body 14, between the underbody portion and the road surface 12, but is not specifically shown. As understood by those skilled in the art, the recirculating airflow region 27-6 is generally caused at elevated vehicle speeds by the flow of surrounding air around the six body sides of the vehicle body 14.

As shown in the Figures, the vehicle 10 also includes a splitter system 28. The splitter system 28 includes a splitter body 30 arranged along a splitter body axis Y and configured to control a movement of the ambient airflow 27 along the longitudinal body axis X of the vehicle body 14. As shown, the splitter body 30 is mounted at the front end 16 to generate an aerodynamic downforce on the vehicle body 14 when the vehicle 10 is in motion. As understood, a pressure differential between the first airflow portion 27-1 and the fourth airflow portion 27-4 generated by the splitter body 30, with the pressure bias favoring the first airflow portion, determines the amount of aerodynamic downforce acting on the front end 16.

The splitter body 30 has a first splitter body side-section 30-1 and a second splitter body side-section 30-2. As shown in FIGS. 1 and 2, when viewed from the perspective of the vehicle front end 16 facing the incident airflow 27, the first splitter body side-section 30-1 is arranged to the left of the longitudinal axis X and adjacent to the first lateral body side or left side 20, while the second splitter body side-section 30-2 is arranged to the right of the longitudinal axis X and adjacent to the second lateral body side or right side 22. The first splitter body side-section 30-1 and the second splitter body side-section 30-2 are independently mounted to the front end 16 thus permitting each body side-section to shift relative to the front end 16 of vehicle body 14 independent of the other body side-section. Accordingly, depending on a specific position of the first splitter body side-section 30-1 and the second splitter body side-section 30-2 the two body side-sections can generate a different magnitude of aerodynamic downforce, a downforce $F_{d1}$ on the left side 20 and a downforce $F_{d2}$ on the right side 22 of the vehicle body 14 when the vehicle 10 is in motion.

As shown in FIGS. 1-4, the splitter system 28 also includes a mechanism 34 configured to selectively and independently shift each of the first splitter body side-section 30-1 and the second splitter body side-section 30-2 relative to the front end 16 and to the respective body sides 20, 22. Specific articulation during shifting of each of the first and second splitter body side-sections 30-1, 30-2 independently via the mechanism 34 can take the form of selective translation of the first and second splitter body side-sections, i.e., extension away from the first vehicle body end 16 into the incident airflow 27 and retraction in opposite direction, as can be seen in FIG. 2, or lowering and raising thereof relative to the road surface 12 and/or rotation or tilting toward and away from the road surface, as can be seen in FIG. 3. While the individual translation of the first and second splitter body side-sections 30-1, 30-2 via the mechanism 34 independently shifts the splitter body side-sections in a direction along the axis X and substantially parallel to the road surface 12, other envisioned articulation may independently shift each of the splitter body side-sections in a direction substantially transverse to the road surface, i.e., toward and away from the road, or simply change angles of the respective splitter body side-sections (as shown in FIG. 3) relative to the body plane P.

As a result of independent articulation of the first and second splitter body side-sections 30-1, 30-2, the mechanism 34 can independently adjust a magnitude of the aerodynamic downforce $F_{d1}$, $F_{d2}$ generated by each splitter body side-section on the vehicle body 14 at the front end 16. In order to effect such regulation of the splitter body 30, as shown in FIG. 1, the mechanism 34 may include a first actuator 36-1, which may be linear or rotary type, configured to selectively articulate, such as raise/lower, translate, tilt, or rotate, the first splitter body side-section 30-1 relative to the front end 16, and a second actuator 36-2 configured to similarly but independently articulate the second splitter body side-section 30-2. Such actuators 36-1 and 36-2 can operate on an electro-mechanical principle, for example can include individual electric motors 38-1 and 38-2 (as shown in FIG. 2), can be hydraulic or mechanical in nature, or employ a combination thereof. As shown in FIG. 2, the mechanism 34 can additionally employ a first gear-train 40-1 in connection with the first actuator 36-1 and a second gear-train 40-2 in connection with the second actuator 36-2 to affect the desired individual raising/lowering, translation, tilting, or rotating of the respective first and second splitter body side-sections 30-1, 30-2 relative to the front end 16.

As shown in FIGS. 1 and 2, the vehicle also includes an electronic controller 42 configured, i.e., constructed and programmed, to regulate the individual actuators 36-1, 36-2 of the mechanism 34. The controller 42 may be configured as a central processing unit (CPU) configured to regulate operation of an internal combustion engine 41 (shown in FIG. 1), a hybrid-electric powertrain (not shown), or other alternative types of powerplants, as well as other vehicle systems, or a dedicated controller. In order to appropriately control operation of the mechanism 34, the controller 42 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 42 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 42 may also include a floppy disk, a flexible disk, hard disk, magnetic tape, any other magnetic medium, a CD-ROM, DVD, any other optical medium, etc. The controller 42 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 42 or accessible thereby may be stored in the memory and automatically executed to provide the required functionality.

As shown in FIG. 1, the vehicle 10 also includes road wheels, shown as a left front road wheel 44-1, a right front road wheel 44-2, a left rear road wheel 44-3, and a right rear road wheel 44-4. A plurality of first sensors 46 may be arranged on the vehicle body 14 for detecting rotating speeds of each road wheel 44-1, 44-2, 44-3, and 44-4. Each first sensor 46 may also be configured to communicate the detected rotating speed of the respective road wheel 44 to the controller 42, while the controller may be configured to correlate the data received from the respective first sensors to road speed of the vehicle 10. The vehicle 10 may also include a second sensor 48 configured to detect a yaw moment or rate on the vehicle body 14 relative to the road surface 12 and communicate the detected yaw rate to the controller 42. The vehicle 10 may additionally include a third sensor 50 configured to detect a velocity of ambient airflow 27 relative to the vehicle 10 and communicate the detected velocity of the ambient airflow to the controller 42. The third sensor 50 may be a pitot tube configured to detect a pressure of the ambient airflow 27 at a specific location relative to the vehicle body 14, and the controller 42 can correlate the measured pressure to airflow velocity.

The controller 42 can also be configured to selectively raise/lower, translate, tilt, or rotate the first and second splitter body side-sections 30-1, 30-2 via the respective actuators 36-1 and 36-2 during cornering of the vehicle 10 in response to the yaw rate detected by the second sensor 48. For example, if the vehicle 10 is negotiating a right-hand high-g turn, the left front wheel 42-1 is subjected to and bears greater cornering load than the right front wheel 42-2. In such a case, the second splitter body side-section 30-2 can, depending on articulation in the specific embodiment, be shifted toward the road surface 12, rotated relative to the body plane P, or extended out into the incident airflow 27, thereby increasing the aerodynamic downforce $F_{d2}$ acting on the right front road wheel 44-2 for balancing the cornering loads between the front road wheels 44-1 and 44-2. Such a selected bias of the aerodynamic downforce on a specific road wheel tends to enhance overall vehicle grip of the road surface 12 at the front end 16 and enhances the ability of the vehicle 10 to maintain a selected line through the turn. Accordingly, the position of each of the first and second splitter body side-sections 30-1, 30-2 can be regulated via the controller 42 relative to the road surface 12 proportionately to the yaw rate generated during cornering of the vehicle 10 by shifting the subject splitter body side-sections either in the same direction and in unison or individually.

Furthermore, the controller 42 may be configured to selectively and individually shift, via the mechanism 34, each of the first and second splitter body side-sections 30-1, 30-2 relative to the front end 16 in response to the rotating speeds of the road wheels 44-1, 44-2, 44-3, and 44-4 detected via the first sensor 46 and/or the velocity of the ambient airflow 27 detected via the third sensor 50. For example, if the vehicle 10 is traveling at an elevated road speed, the first and second splitter body side-sections 30-1, 30-2 can be rotated or tilted toward the road surface 12, lowered toward the road surface, or translated away from the front end 16 into the oncoming airflow 27 to increase the aerodynamic downforce $F_{d1}$, $F_{d2}$ acting on the left front road wheel 44-1 and the right front road wheel 44-2 and enhance the stability and steering response of the vehicle at such conditions. On the other hand, the first and second splitter body side-sections 30-1, 30-2 can be rotated or tilted away from the road surface 12, raised away from the road surface, or translated toward or into the front end 16 and out of the oncoming airflow 27 to decrease the downforce $F_{d1}$, $F_{d2}$, and, as a result, decrease aerodynamic drag of the vehicle 10.

The controller 42 may also be programmed to determine a slip of the vehicle 10 relative to the road surface 12. The slip of the vehicle 10 may include a measure of how much each of the road wheels 44 has slipped in a direction that is generally perpendicular to the longitudinal vehicle axis X, which identifies that the vehicle has deviated from an intended direction or path along the road surface 12. The intended direction of the vehicle 10 may be identified by the steering wheel angle, which can be detected by a fourth sensor 52 operatively connected to a steering wheel 54 (shown in FIG. 1) and communicated to the controller 42. Furthermore, the controller 42 may be programmed to compare the determined steering wheel angle and yaw rate to determine how much the vehicle has deviated from its intended direction or path.

The controller 42 may also be programmed to control the slip of the vehicle 10 relative to the road surface 12 by individually controlling position of the first and second splitter body side-sections 30-1, 30-2 relative to the road surface 12 via the mechanism 34 in response to how much the vehicle has deviated from its intended path. The employed change in the position of the first and second splitter body side-sections 30-1, 30-2 then urges the vehicle 10 to return the actual vehicle heading to the desired heading being commanded by an operator of the vehicle at the steering wheel 54. For example, if the vehicle 10 is negotiating a high-g right-hand turn, the left front wheel 44-1 will be subjected to and bear greater cornering load than the right front wheel 44-2. In such a case, the second splitter body side-section 30-2 can, depending on articulation in the specific embodiment, be shifted toward the road surface 12, rotated relative to the body plane P, or translated out into the oncoming airflow 27, thereby increasing the aerodynamic downforce $F_{d2}$ acting on the right front road wheel 44-2 in order to balance the cornering loads between the front road wheels 44-1 and 44-2. Such a selected variation or bias in the aerodynamic downforce $F_{d1}$, $F_{d2}$ on a specific road wheel tends to enhance overall vehicle grip of the road surface 12 at the front end 16 and the ability of the vehicle 10 to maintain a selected line through the turn. Additionally, two third sensors 50 may be arranged on the splitter body 30, one such third sensor on the first end 30-1 and another third sensor on the second end 30-2 (not shown). The controller 42 may then be configured to vary the position of the first and second splitter body side-sections 30-1, 30-2, as described above, in response to a determined differential between air velocity measurements at each third sensor 50 as the vehicle 10 enters and negotiates a turn to vary the downforce $F_{d1}$, $F_{d2}$ on the vehicle body 14.

The controller 42 may be additionally programmed with a lookup table 56 establishing correspondence between the previously described vehicle parameters—the vehicle slip, yaw rate, vehicle road speed, and/or velocity of the airflow and appropriate position of the first and second splitter body side-sections 30-1, 30-2 for affecting appropriate regulation of the mechanism 34. Specifically, the lookup table 56 can establish a correspondence of magnitude of shift for each of the first splitter body side-section 30-1 and the second splitter body side-section 30-2 and a magnitude of the aerodynamic downforce $F_{d1}$, $F_{d2}$ generated by the splitter system 28 on the front body end 16. The lookup table 56 may be developed empirically during validation and testing of the vehicle 10. As the position of the first and second splitter body side-sections 30-1, 30-2 is varied relative to the front end 16 and the respective body sides 20, 22 during the cornering event or at elevated road speeds, the splitter system 28 can adjust the downforce $F_{d1}$, $F_{d2}$ side-to-side at the front end 16 of the vehicle body 14 to affect the dynamic behavior of the vehicle 10.

For example, the controller 42 may be configured, via the lookup table 56 or otherwise, to individually vary an angle $\theta_1$ (shown in FIG. 3) of the first splitter body side-section 30-1 and a similar angle $\theta_2$ of the second splitter body side-section 30-2 with respect to the front end 16 and the respective body sides 20, 22 in response to the rotating speeds of the road wheels 44-1, 44-2, 44-3, 44-4 detected via the first sensors 46 and/or the velocity of the ambient airflow 27 detected via the fourth sensor 52. Furthermore, the angles $\theta_1$ and $\theta_2$ of the adjustable first and second splitter body side-sections 30-1, 30-2 can be individually controlled proportionately to the yaw rate generated during cornering of vehicle 10 by selectively operating the mechanism 34. According to the disclosure, for the embodiment that includes rotation or tilting of the first and second splitter body side-sections 30-1, 30-2, angles $\theta_1$ and $\theta_2$ having values around 45 degrees generate the greatest downforce $F_{d1}$, $F_{d2}$ on the front end 16, while angles $\theta_1$ and $\theta_2$ having values around 0 degrees or 90 degrees generate minimal downforce.

Overall, control of the position of the first and second splitter body side-sections 30-1, 30-2 may be employed to maintain contact of the vehicle 10 with the road surface 12 at elevated speeds by countering aerodynamic lift of the vehicle body 14 in response to the velocity of ambient airflow 27 detected by the third sensor 50. Additionally, control of the position of the first and second splitter body side-sections 30-1, 30-2 may be employed to aid handling of the vehicle 10 in order to maintain the vehicle on its intended path by countering and controlling the yaw moment acting on the vehicle body 14 as detected by the second sensor 48.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A splitter system for a vehicle having a vehicle body arranged along a longitudinal body axis and including a first vehicle body end configured to face incident ambient airflow, the splitter system comprising:
   a splitter body having a first splitter body side-section and a second splitter body side-section and configured to be mounted at the first vehicle body end and generate an aerodynamic downforce on the first vehicle body end when the vehicle is in motion; and
   a mechanism configured to selectively and individually translate each of the first splitter body side-section and the second splitter body side-section along the longitudinal body axis away from the first vehicle body end into the incident ambient airflow and toward the first vehicle body end out of the incident ambient airflow to thereby adjust a magnitude of the aerodynamic downforce generated by each of the first splitter body side-section and the second splitter body side-section on the first vehicle body end.

2. The splitter system according to claim 1, further comprising an electronic controller configured to regulate the mechanism.

3. The splitter system according to claim 2, wherein the vehicle includes a road wheel, the splitter system further comprising a first sensor configured to detect a rotating speed of the road wheel and communicate the detected rotating speed of the road wheel to the controller.

4. The splitter system according to claim 3, further comprising a second sensor configured to detect a yaw rate of the vehicle body and communicate the detected yaw rate to the controller.

5. The splitter system according to claim 4, further comprising a third sensor configured to detect a velocity of ambient airflow relative to the vehicle and communicate the detected velocity of the ambient airflow to the controller.

6. The splitter system according to claim 5, wherein the vehicle includes a steering wheel, the splitter system further comprising a fourth sensor configured to detect an angle of the steering wheel.

7. The splitter system according to claim 6, wherein the controller is configured to selectively shift, via the mechanism, at least one of the first splitter body side-section and the second splitter body side-section relative to the first vehicle body end during vehicle cornering in response to the detected yaw rate, the detected angle of the steering wheel, and at least one of the detected rotating speed of the road wheel and velocity of the ambient airflow, to thereby vary the aerodynamic downforce on the first vehicle body end and control the detected yaw rate.

8. The splitter system according to claim 7, wherein the controller is programmed to selectively shift, via the mechanism, at least one of the first splitter body side-section and the second splitter body side-section relative to the first vehicle body end according to a lookup table establishing a correspondence of magnitude of shift of each of the first splitter body side-section and the second splitter body side-section and a magnitude of the aerodynamic downforce generated by each of the first splitter body side-section and the second splitter body side-section on the first vehicle body end.

9. The splitter system according to claim 1, wherein the mechanism additionally includes at least one of a linear actuator, a rotary actuator, and an electric motor.

10. A vehicle comprising:
a vehicle body arranged along a longitudinal body axis and having a first vehicle body end configured to face incident ambient airflow; and
a splitter system having:
a splitter body arranged at the first vehicle body end, having a first splitter body side-section and a second splitter body side-section, and configured to generate an aerodynamic downforce on the first vehicle body end when the vehicle is in motion; and
a mechanism including:
a first actuator and a first gear-train in operative connection with the first actuator and configured to rotate and selectively lower and raise the first splitter body side-section relative to the first vehicle body end to thereby adjust a magnitude of the aerodynamic downforce generated by the first splitter body side-section on the first vehicle body end; and
a second gear-train in operative connection with the second actuator and configured to rotate and selectively lower and raise the second splitter body side-section relative to the first vehicle body end to thereby adjust a magnitude of the aerodynamic downforce generated by the second splitter body side-section on the first vehicle body end.

11. The vehicle according to claim 10, further comprising an electronic controller configured to regulate the mechanism.

12. The vehicle according to claim 11, further comprising a road wheel and a first sensor configured to detect a rotating speed of the road wheel and communicate the detected rotating speed of the road wheel to the controller.

13. The vehicle according to claim 12, further comprising a second sensor configured to detect a yaw rate of the vehicle body and communicate the detected yaw rate to the controller.

14. The vehicle according to claim 13, further comprising a third sensor configured to detect a velocity of ambient airflow relative to the vehicle and communicate the detected velocity of the ambient airflow to the controller.

15. The vehicle according to claim 14, further comprising a steering wheel and a fourth sensor configured to detect an angle of the steering wheel.

16. The vehicle according to claim 15, wherein the controller is configured to selectively shift, via the mechanism, at least one of the first splitter body side-section and the second splitter body side-section relative to the first vehicle body end during vehicle cornering in response to the detected yaw rate, the detected angle of the steering wheel, and at least one of the detected rotating speed of the road wheel and velocity of the ambient airflow, to thereby vary the aerodynamic downforce on the first vehicle body end and control the detected yaw rate.

17. The vehicle according to claim 16, wherein the controller is programmed to selectively shift, via the mechanism, at least one of the first splitter body side-section and the second splitter body side-section relative to the first vehicle body end according to a lookup table establishing a correspondence of magnitude of shift of each of the first splitter body side-section and the second splitter body side-section and a magnitude of the aerodynamic downforce generated by each of the first splitter body side-section and the second splitter body side-section on the first vehicle body end.

18. The vehicle according to claim 10, wherein the mechanism additionally includes at least one of a linear actuator, a rotary actuator, and an electric motor.

19. A vehicle comprising:
a vehicle body arranged along a longitudinal body axis and having a first vehicle body end configured to face incident ambient airflow;
a road wheel;
a steering wheel; and
a splitter system having:
a splitter body arranged at the first vehicle body end, having a first splitter body side-section and a second splitter body side-section, and configured to generate an aerodynamic downforce on the first vehicle body end when the vehicle is in motion;
a mechanism configured to selectively and individually translate each of the first splitter body side-section and the second splitter body side-section along the longitudinal body axis away from the first vehicle body end into the incident ambient airflow and toward the first vehicle body end out of the incident ambient airflow to thereby adjust a magnitude of the aerodynamic downforce generated by each of the first splitter body side-section and the second splitter body side-section on the first vehicle body end
an electronic controller configured to regulate the mechanism;
a first sensor configured to detect a rotating speed of the road wheel and communicate the detected rotating speed of the road wheel to the controller;
a second sensor configured to detect a yaw rate of the vehicle body and communicate the detected yaw rate to the controller;
a third sensor configured to detect a velocity of ambient airflow relative to the vehicle and communicate the detected velocity of the ambient airflow to the controller; and
a fourth sensor configured to detect an angle of the steering wheel;
wherein the controller is configured to selectively shift, via the mechanism, at least one of the first splitter body side-section and the second splitter body side-section relative to the first vehicle body end during vehicle cornering in response to the detected yaw rate, the detected angle of the steering wheel, and at least one of the detected rotating speed of the road wheel and velocity of the ambient airflow, to thereby vary the aerodynamic downforce on the first vehicle body end and control the detected yaw rate.

20. The vehicle according to claim 19, wherein the controller is programmed to selectively shift, via the mechanism, at least one of the first splitter body side-section and the second splitter body side-section relative to the first vehicle body end according to a lookup table establishing a correspondence of magnitude of shift of each of the first splitter body side-section and the second splitter body side-section and a magnitude of the aerodynamic downforce generated by each of the first splitter body side-section and the second splitter body side-section on the first vehicle body end.

* * * * *